(12) United States Patent (10) Patent No.: US 11,655,622 B2
Shen et al. (45) Date of Patent: May 23, 2023

(54) SMART TOILET AND ELECTRIC APPLIANCE SYSTEM

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Jin Shen, Zhuhai (CN); Dechao Song, Zhuhai (CN); Chong Chen, Zhuhai (CN); Xianjun He, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 306 days.

(21) Appl. No.: 16/965,286

(22) PCT Filed: Oct. 23, 2018

(86) PCT No.: PCT/CN2018/111476
§ 371 (c)(1),
(2) Date: Jul. 27, 2020

(87) PCT Pub. No.: WO2019/144658
PCT Pub. Date: Aug. 1, 2019

(65) Prior Publication Data
US 2021/0071401 A1 Mar. 11, 2021

(30) Foreign Application Priority Data
Jan. 29, 2018 (CN) .......................... 201810082073.8

(51) Int. Cl.
*E03D 9/00* (2006.01)
*E03D 5/10* (2006.01)
(Continued)

(52) U.S. Cl.
CPC ............... *E03D 9/00* (2013.01); *E03D 5/105* (2013.01); *G06F 18/214* (2023.01);
(Continued)

(58) Field of Classification Search
CPC .............. E03D 5/105; E03D 9/00; E03D 1/26
See application file for complete search history.

(56) References Cited

U.S. PATENT DOCUMENTS 11,287,415 B2 * 3/2022 Barakat ............ G01N 33/48792
2016/0162671 A1 * 6/2016 Baca .................... G06V 40/172
382/115

(Continued)

FOREIGN PATENT DOCUMENTS

CN 1711048 A 12/2005
CN 1804859 A 7/2006
(Continued)

OTHER PUBLICATIONS

International Search Report for corresponding International App No. PCT/CN2018/111476, dated Jan. 4, 2019, 3 pages.

*Primary Examiner* — Christine J Skubinna
(74) *Attorney, Agent, or Firm* — Armstrong Teasdale LLP

(57) ABSTRACT

A smart toilet (100) includes an information acquisition device (110) and a control device (120). The information acquisition device (110) is configured to acquire feature information of the smart toilet (100) in a working state, the feature information at least including voiceprint information and odor information, or voiceprint information, or odor information of a human body using the smart toilet (100). The control device (120) includes an identity recognition component (121) configured to recognize, according to the feature information, the identity of the human body using the smart toilet (100). An electric appliance system including the smart toilet (100) is further included.

18 Claims, 2 Drawing Sheets

(51) Int. Cl.
  *G06N 3/08*        (2023.01)
  *G06V 40/10*       (2022.01)
  *G06V 40/16*       (2022.01)
  *G06F 18/214*      (2023.01)
  *G06F 18/23213*    (2023.01)
  *G06V 10/764*      (2022.01)
  *G06V 10/82*       (2022.01)

(52) U.S. Cl.
  CPC ......... *G06F 18/23213* (2023.01); *G06N 3/08* (2013.01); *G06V 10/764* (2022.01); *G06V 10/82* (2022.01); *G06V 40/10* (2022.01); *G06V 40/161* (2022.01); *G06V 40/168* (2022.01); *G06V 40/172* (2022.01)

(56) References Cited

U.S. PATENT DOCUMENTS

| | | | | |
|---|---|---|---|---|
| 2018/0010322 A1* | 1/2018 | Grover | ................ | G01F 23/2962 |
| 2018/0020984 A1* | 1/2018 | Hall | ....................... | A47K 13/24 |
| | | | | 600/301 |
| 2019/0008457 A1* | 1/2019 | Hall | ..................... | A61B 5/6891 |
| 2019/0089550 A1* | 3/2019 | Rexach | .................. | A47G 29/08 |

FOREIGN PATENT DOCUMENTS

| | | |
|---|---|---|
| CN | 201328144 Y | 10/2009 |
| CN | 104452926 A | 3/2015 |
| CN | 105256871 A | 1/2016 |
| CN | 105374355 A | 3/2016 |
| CN | 105951955 A | 9/2016 |
| CN | 106400918 A | 2/2017 |
| CN | 106502120 A | 3/2017 |
| CN | 106567435 A | 4/2017 |
| DE | 202012104219 U1 | 7/2013 |
| JP | H05192269 A | 8/1993 |
| JP | H085631 A | 1/1996 |
| JP | 2000148985 A | 5/2000 |
| JP | 2001137199 A | 5/2001 |
| JP | 2001265822 A | 9/2001 |
| JP | 2016001838 A | 1/2016 |
| JP | 2017174012 A | 9/2017 |

* cited by examiner

SMART TOILET AND ELECTRIC APPLIANCE SYSTEM

CROSS REFERENCE TO RELATED APPLICATIONS

The present application is a national stage entry of International Patent Application No. PCT/CN2018/111476, filed on Oct. 23, 2018, and claims priority of Chinese Patent Application No. 201810082073.8, filed on Jan. 29, 2018, the contents of which are hereby incorporated by reference in their entirety.

TECHNICAL FIELD

The disclosure relates to the field of electric appliances, and in particular to a smart toilet and an electric appliance system.

BACKGROUND

With the development of an Internet of Things technology, smart life will become a healthy and fashionable trend. A toilet is also a very important necessity in people's daily life. A traditional toilet has a single flush function, which is far from meeting people's demand for a healthy life.

A smart detection system and method for a smart health toilet known to the inventors uses fingerprint recognition and key recognition to recognize an identity of a user. This mode requires the user to first use a finger to press a key to perform fingerprint recognition before using the toilet, and is inconvenient to use and insanitary. A toilet with an identity recognition function known to the inventors recognizes an identity of a user using a toilet currently according to weight carried on a toilet ring. Obviously, when there are multiple people with the same weight to use the toilet at the same time, this solution does not accurately recognize the true identity of the user. A smart toilet with a voice control function known to the inventors proposes to control a toilet through a voice of a user, such as, "flush" and "play music", however an identity of the user is not recognized.

SUMMARY

The smart toilet includes:

an information acquisition apparatus, configured to acquire feature information of the smart toilet in a working state, the feature information at least including voiceprint information of a human body using the smart toilet and odor information of the human body using the smart toilet, or voiceprint information of a human body using the smart toilet, or odor information of the human body using the smart toilet; and a control apparatus, comprising an identity recognition component, configured to recognize, according to the feature information, an identity of the human body using the smart toilet.

An electric appliance system includes the aforementioned smart toilet. The electric appliance system further includes a smart device. The smart device includes least one of a wearable device, home fitness equipment, and a household appliance.

The smart toilet is connected with the smart device, and both the smart toilet and the smart device are connected with a server, or the smart toilet is connected with the smart device, or both the smart toilet and the smart device are connected with a server.

BRIEF DESCRIPTION OF THE DRAWINGS

The above and other objectives, features and advantages of the disclosure will be clearer through the following description of the embodiments of the disclosure with reference to the drawings. In the drawings.

Figure 1:
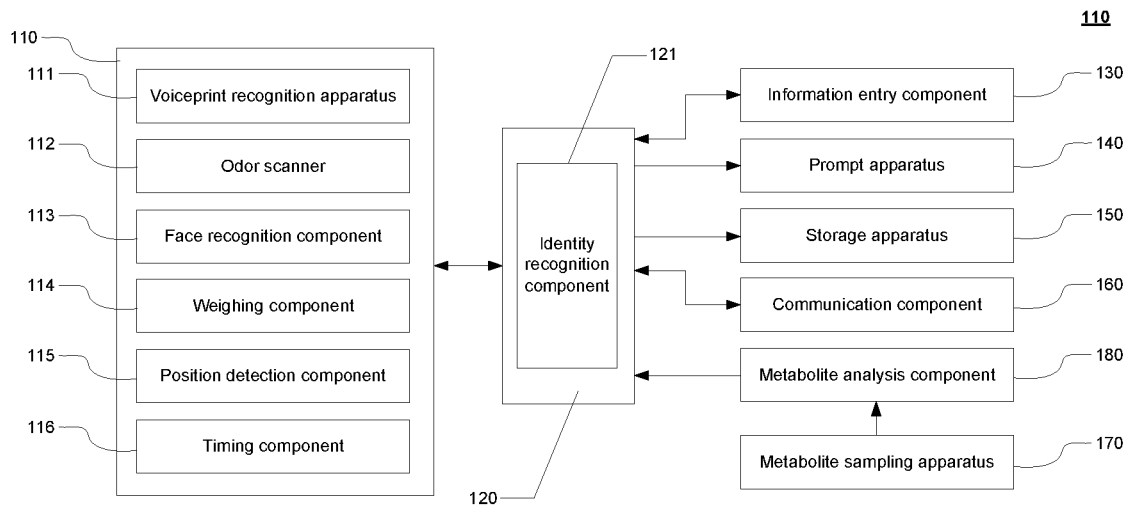
FIG. 1 illustrates a schematic system diagram of a smart toilet according to a specific implementation manner of the disclosure.

100, Smart toilet; 110, information acquisition apparatus; 111, voiceprint recognition apparatus; 112, odor scanner; 113, face recognition component; 114, weighing component; 115, position detection component; 116, timing component; 120, control apparatus; 121, identity recognition component; 130, information entry component; 140, prompt apparatus; 150, storage apparatus; 160, communication component; 170, metabolite sampling apparatus; 180, metabolite analysis component; 200, server; 300, online diagnosis platform; 400, mobile terminal; 500, household appliance; 600, home fitness equipment; 700, wearable device.

DETAILED DESCRIPTION

The following describes the disclosure based on the embodiments, but the disclosure is not limited to these embodiments. In order to avoid confusing the essence of the disclosure, well-known methods, processes, flows, and elements have not been described in detail.

In addition, those of ordinary skill in the art should understand that the drawings provided herein are for illustrative purposes, and the drawings are not necessarily drawn to scale.

Unless the context clearly requires, the words "including", "containing" and the like in the entire specification and claims should be interpreted as the meaning of inclusive rather than exclusive or exhaustive meaning, that is, "including but not limited to" meaning.

In the description of the disclosure, it should be understood that the terms "first", "second", etc. are for descriptive purposes, and cannot be understood as indicating or implying relative importance. In addition, in the description of the disclosure, unless otherwise stated, the meaning of "multiple" is two or more.

The terms "a/an" and "the" and similar words (especially in the appended claims) are used in describing the concepts of the disclosure, and these terms should be interpreted to cover both singular and plural. In addition, unless otherwise stated herein, when describing a numerical range herein, it is a shortcut method to refer to each independent value belonging to a relevant range, and each independent value is incorporated into this specification as if these values were stated separately herein. In addition, unless otherwise indicated herein or the context clearly indicates the contrary, the steps of all methods described herein are performed in any appropriate order. The changes in the disclosure are not limited to the described sequence of steps. Unless otherwise claimed, the use of any and all examples or exemplary language (e.g., "for example") provided herein is merely to better illustrate the concept of the disclosure and does not limit the scope of the concept of the disclosure. Those skilled in the art will readily understand various modifications and adaptations without departing from the spirit and scope.

The disclosure provides a smart toilet. The user experience is improved through intelligent processing of the toilet. The smart toilet is, for example, a squat toilet or a toilet (that is, toilet).

As shown in FIG. 1, the smart toilet includes an information acquisition apparatus 110 and a control apparatus 120. The information acquisition apparatus 110 is configured to acquire feature information of the smart toilet 100 in a working state. The feature information includes, for example, voiceprint information, odor information and the like of a human body using the smart toilet 100. The so-called voiceprint is a sound wave spectrum carrying speech information, which is displayed by an electro-acoustic instrument. The generation of human language is a complex physiological and physical process between a human language center and pronunciation organs. The vocal organs used by people in speech, including tongue, teeth, throat, lungs, and nasal cavity, vary greatly in size and shape from person to person. Therefore, the voiceprint spectra of any two people are different. Everyone's speech acoustic features have both relative stability and variability, which are not absolute and invariable. In some embodiment, this variation comes from physiology, pathology, psychology, simulation, and camouflage, and is also related to environmental interference. Nevertheless, since each person's pronunciation organs are different, a voiceprint recognition apparatus still distinguishes the voices of different people or determine whether it is the voice of the same person. Since different individuals have unique voiceprint and odors (for example, when a user likes to smoke, there is usually a smell of smoke on the body), an identity of a user who is using the smart toilet 100 is accurately recognized by acquiring voiceprint information and odor information. For example, the control apparatus 120 includes an identity recognition component 121. The identity recognition component 121 is configured to perform identity recognition according to the feature information of the human body using the smart toilet 100 acquired by the information acquisition apparatus 110.

In some embodiment, the identity of the user is pre-entered into the control apparatus 120. For example, the smart toilet includes an information entry component 130. In some embodiment, the user enters personal information through the information entry component 130. The identity recognition component 121 performs identity recognition on the human body using the smart toilet 100 according to features and identity information entered into the information entry component 130. That is, the user first enters personal information in the smart toilet 100, including name, age, sex, weight, height, etc., to facilitate matching of a detection result with the user after the smart toilet detects metabolites of the user subsequently. Of course, it can be understood that the personal information of the user is further established by the smart toilet 100 autonomously. For example, when a user uses the smart toilet 100, the smart toilet 100 automatically sets up files for the user and stores a subsequent detection result into the files. The user subsequently names the files accordingly, and when the smart toilet 100 detects that this smart toilet is used by another user, the smart toilet 100 separately sets up files for the other user.

In some embodiment, voiceprint information and odor information are detected by specific sensors. The control apparatus 120 is connected with each of the specific sensors and communicates in a wired or wireless manner. In some embodiments, the information acquisition apparatus 110 includes a voiceprint recognition apparatus 111 for acquiring voiceprint information. The process of voiceprint recognition includes the following steps.

At step A, feature extraction is performed. Acoustic or linguistic features that have strong separability and high stability to the speakers voiceprint are extracted and selected. Unlike speech recognition, features of voiceprint recognition are "personalized" features, and features of speaker recognition are "common features" for speakers. Although most voiceprint recognition systems currently use features at the acoustic level, features that characterize a person should be multi-level, including: (1) acoustic features related to an anatomical structure of a human pronunciation mechanism (such as spectrum, cepstrum, formants, fundamental sounds, and reflection coefficient), nasal sounds, deep breath sounds, hoarse sounds, laughter, etc.; (2) semantics, rhetoric, pronunciation, language habits, etc. affected by socioeconomic status, education level, birthplace, etc.; (3) personal characteristics or features of rhythm, rhythm, speed, intonation, volume, etc. influenced by parents. From the perspective of mathematical modeling, the features currently available for automatic voiceprint recognition models include: (1) acoustic features (cepstrum); (2) lexical features (speaker-related words n-gram, and phoneme n-gram); (3) prosodic features (using pitch and energy "postures" described by n-gram); (4) language, dialect and accent information; (5) channel information (which channel to use).

At step B, pattern matching is performed.

During a process of pattern recognition, the following methods are provided.

In a template matching method, dynamic time warping (DTW) is used for aligning training and test feature sequences, mainly for fixed phrase disclosures (usually text-related tasks).

In a nearest neighbor method, all feature vectors are retained during training, the nearest K of the training vectors are found for each vector during recognition, and recognition is performed accordingly.

In a neural network method, there are many forms, such as multi-layer perception and radial basis function (RBF), which are explicitly trained to distinguish speakers from background speakers of these speakers.

In a hidden Markov model (HMM) method, a single-state HMM or a Gaussian mixture model (GMM) is usually used.

In a VQ clustering method (such as LBG), this method is optionally used in conjunction with the HMM method.

A Polynomial classifier method is further provided.

The information acquisition apparatus further includes an odor scanner 112 (that is, an electronic nose) for acquiring odor of a user. The electronic nose is an electronic system that uses a response pattern of a gas sensor array to recognize the odor. The electronic nose is mainly composed of three functional devices namely an odor sampling operator, a gas sensor array, and a signal processing system. The main mechanism for the electronic nose to recognize odors is that each sensor in the array has different sensitivity to measured gases. For example, a first gas produces a high response on a certain sensor, but a low response to other sensors. Similarly, a sensor to which a second gas produces a high response is not sensitive to the first gas. The response pattern of the entire sensor array to different gases is different. Due to the difference, the system recognizes the odor according to the response pattern of the sensor. Specifically, a certain odor is presented in front of a sensor of an active material. The sensor converts the chemical input into an electrical signal. The response of multiple sensors to an odor constitutes the response spectrum of the sensor array to the odor.

Obviously, various chemical compositions in the odor will interact with sensitive materials, so this response spectrum is a broad spectrum response spectrum of the odor. In order to achieve qualitative or quantitative analysis of odor, the signal of the sensor is properly pre-processed (noise removal, feature extraction, signal amplification, etc.) and then processed by an appropriate pattern recognition analysis method. In theory, each odor will have a feature response spectrum of this odor, and different odors are distinguished according to the feature response spectrum. At the same time, an array of gas sensors is also used for measuring the cross-sensitivity of multiple gases, and an appropriate analysis method is used for achieving mixed gas analysis.

In order to further improve the accuracy of identity recognition, in some embodiment, the feature information further includes face image information, a weight of the human body, a position of the human body relative to the smart toilet, usage time of the smart toilet, etc. For example, the information acquisition apparatus further includes a face recognition component 113, a weighing component 114, a position detection component 115, a timing component 116, etc. The face recognition component 113 performs face recognition on the user using the smart toilet. The face recognition component 113 includes a face image acquisition portion, a face image preprocessing portion, a face image feature extraction portion, and a face image matching and recognition portion. In the face image acquisition portion, a face image is acquired through a camera lens. For example, a static image, a dynamic image, different positions, different expressions and other aspects are well acquired. When the user is within a shooting range of an acquisition device, the acquisition device will automatically search for and capture a face image of the user. In the face image preprocessing portion, the image preprocessing for the face is the process of processing an image based on a face detection result and finally serving feature extraction. An original image acquired by the system is often not directly usable due to various condition limitations and random interference. The image is preprocessed in the early stages of image processing such as grayscale correction and noise filtering. For a face image, the preprocessing process mainly includes light compensation, grayscale transformation, histogram equalization, normalization, geometric correction, filtering and sharpening of the face image. In the face image feature extraction portion, available features are generally divided into visual features, pixel statistical features, face image transform coefficient features, face image algebraic features, etc. Face feature extraction is carried out for certain features of face. Face feature extraction, also known as face characterization, is a process of feature modeling for human faces. The methods of face feature extraction are summarized into two categories. One category is a knowledge-based representation method, and the other category is a representation method based on algebraic features or statistical learning. The knowledge-based representation method is to obtain feature data that is helpful for face classification according to shape description of face organs and distance characteristics between the face organs. The feature compositions usually include Euclidean distance between feature points, curvature, angle, etc. The face is composed of eyes, nose, mouth, chin and other parts. The geometric description of these parts and a structural relationship are used as an important feature to recognize the face. These features are called geometric features. The knowledge-based face representation mainly includes geometric feature-based methods and template matching methods. In the face image matching and recognition portion, the extracted feature data of the face image is matched with a feature template stored in a database. By setting a threshold, when the similarity exceeds this threshold, a matching result is output. Face recognition is to compare face features to be recognized with the obtained face feature template, and determine the identity information of the face according to the similarity. This process is divided into two categories. One category is confirmation, which is a one-to-one image comparison process, and the other category is recognition, which is a one-to-many image matching and comparison process. Since the user aims at a camera of the face recognition component when performing face recognition, in order to facilitate the acquisition of the face image, in some embodiments, the camera of the face recognition component is provided at a position on the opposite side of the toilet corresponding to the height of the head. In this way, the user does not deliberately find the camera, and when the user normally uses the smart toilet, face recognition is automatically performed on the user.

The weight of the user who uses the smart toilet is weighed by the weighing component 114. The weighing component 114 is, for example, a weight sensor. In some embodiments, when the smart toilet is a toilet, the weight sensor is provided below a toilet ring. In some embodiments, when the smart toilet is a squat toilet, the weight sensor is provided below the ground on which the user steps.

The position detection component 115 detects the position of the human body relative to the smart toilet 100. Since different users usually have their own unique toilet habits, different users have slight changes in the position of the smart toilet 100 when using the smart toilet 100. The identity recognition component 121 finds these slight changes based on the user location analysis detected by the position detection component 115, so as to use the slight changes as one factor to recognize the identity of the user. Of course, in some embodiments, the position detection component 115 is not provided, but multiple weight sensors are provided at different positions of the smart toilet 100. If the position of the user is different, the weights detected by the multiple weight sensors are also different. The position of the user relative to the smart toilet 100 is analyzed according to the detection amounts of the multiple weight sensors.

The timing component detects the usage time of the smart toilet 100. Since different users have their own unique toilet habits, for example, some users like to play mobile phones while using the toilet or have constipation problems, a toilet time period is usually longer. The identity recognition component 121 uses the toilet time period of the user counted by the timing component 116 as one factor to recognize the identity of the user. In a specific embodiment, when the weighing component 114 detects that the weight increase is large and lasts for a predetermined time period (for example, 10 s), it indicates that a user has started to use the smart toilet. At this time, the timing component 116 starts timing until the weighing component 114 does not detect the weight within a predetermined time period (for example, 10 s) (or until it is detected the user flushes), it indicates that the user has finished using the toilet, and the timing component 116 stops timing.

In some embodiments, the identity recognition component 121 uses an artificial neural network algorithm to recognize the identity of the human body using the smart toilet 100 according to the feature information. Specifically, user identity data is collected in a large number of different use environments (including but not limited to at least one of the followings: user voiceprint information, user odor information, user toilet time period, user weight and other comprehensive methods, etc.), a number of body feature state parameters are selected as sample data to learn and train a neural network. A network structure and weights between network nodes are adjusted, so that the neural network fits a relationship between the identity of the user and feature information. And finally, the neural network accurately fits the corresponding relationship between the identity of the user and the feature information. The specific implementation steps are as follows.

At step S001, data collection is performed.

Own feature information parameters and corresponding identity information of a user under different usage environments are collected. Specific collection modes include but are not limited to modes of simulating feature parameters in an environment in a laboratory (that is, user actively allow smart toilets to obtain their feature information, including voiceprint information, odor, weight, face images, etc.), collecting feature information parameters in the actual use by users through an Internet of Things technology (that is, users passively collect their feature information parameters by various electric appliances in the Internet of Things), etc.

At step S002, sample data selection is performed.

Through the analysis of data and the combination of expert experience and knowledge, parameters that have an impact on an identity status of a user are selected as input parameters, and the identity information status of the user is determined as an output parameter. The input parameters include but are not limited to at least one of the followings: voiceprint information of the user, odor information of the user, toilet time period of the user, the weight of the user and other comprehensive modes, a health plan returned by a treadmill, recipe information returned by a household appliance, etc. The input parameters are not only single parameters, but also include one-dimensional or multi-dimensional arrays of input parameters composed of features extracted according to certain rules.

Part of the obtained input and output parameter pairs are used as training sample data and part are used as test sample data.

At step S003, network structure design is performed.

Figure 2:
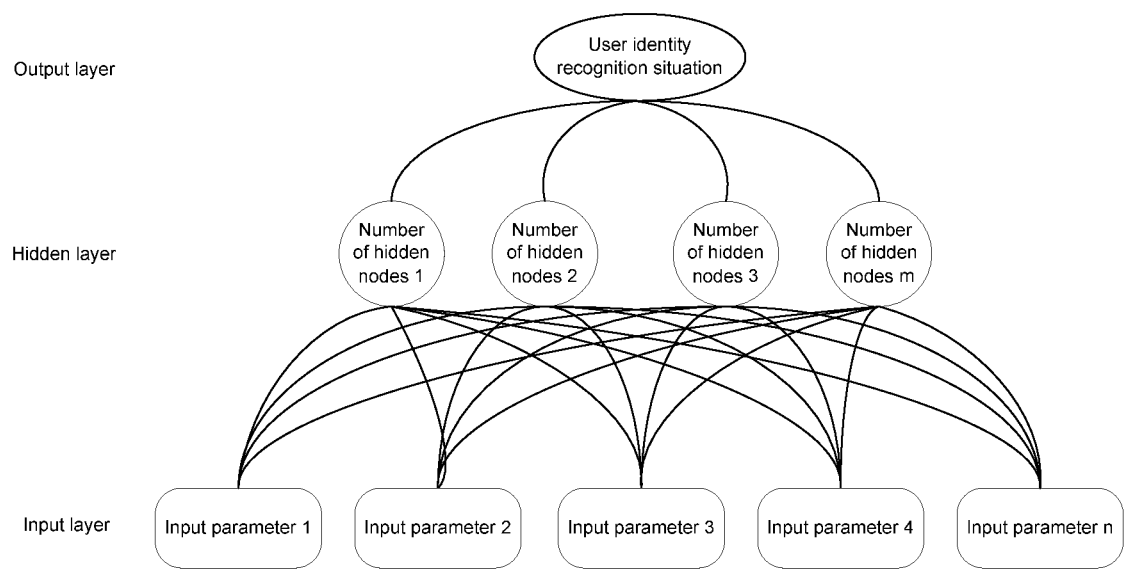
FIG. 2 illustrates a structure diagram of a neural network algorithm according to a specific implementation manner of the disclosure.

According to the feature information of the user and the rules contained in the feature information, a basic structure of a network, the number of input and output nodes of the network, the number of hidden layers of the network, the number of hidden nodes, an initial weight of the network and the like are determined initially. A schematic diagram of a neural network algorithm of the disclosure is shown in FIG. 2.

At step S004, network training and testing is performed.

After the network design is completed, it is necessary to use the training sample data to train the network.

The training method is adjusted according to an actual network structure and the problems found in the training. Here is an example for one of the methods of the disclosure as follows.

Input data x is imported, and an actual output a(x) of a network is calculated according to an activation function, an initialized weight and offset, that is, $a(x)=1/(1+e-z)$, where $Z=Wk*x+bl$.

It is determined whether an expected output y(x) and the actual output a(x) of the network meet output accuracy requirements, that is:

$\|Y(x)-a(x)\|<\in$, and $\in$ is a target minimum error.

After the network training is completed, test samples are used for positively testing the network. When the test error does not meet the requirements, the above steps are repeated to retrain the network. When the test error meets the requirements, the network training test is completed.

Further, in some embodiment, the control apparatus 120 further controls the start and stop of each sensor. For example, when the weighing component 114 detects that the weight increase is large and lasts for a predetermined time period (for example, 10 s), it indicates that a user has started to use the smart toilet, and the control apparatus 120 controls each sensor to be started to obtain user feature parameters. When the weighing component 114 does not detect the weight within a predetermined time period (for example, 10 s) (or when it is detected the user flushes), it indicates that the user has finished using the toilet, and the control apparatus controls each sensor to be stopped.

Furthermore, the human body absorbs nutrients from the outside world every day, and at the same time expels own metabolites out of the body. Metabolism is a cyclical and dynamic process. The human body maintains the normal operation of the body in such a dynamic balance. When a disease occurs in the body, this dynamic balance will be broken, and then the waste metabolized by the human body will appear abnormal. Based on analysis mentioned above, the smart toilet further includes a metabolite sampling apparatus 170 and a metabolite analysis component 180. The metabolite sampling apparatus 170 is configured to sample metabolites excreted into the smart toilet 100 by the human body. The metabolite analysis component 180 is configured to analyze the compositions of the metabolites sampled by the metabolite sampling apparatus 170, for example, to analyze at least one of the followings: pH, urine specific gravity, urobilinogen, occult blood, leukocyte content, urine protein content, bilirubin content, ketone body content, urine red blood cell content, and urine color in the urine of the user, and for example, to analyze at least one of the followings: a red blood cell count, white blood cell content, pus cell content, and the type and content of parasite eggs in the feces of the user. In this way, users do not go to the hospital to queue up and register to easily know their own health status.

The control apparatus 120 determines the health status of the user according to the compositions of the metabolites of the user analyzed by the metabolite analysis component 180. For example, the smart toilet 100 further includes a prompt apparatus 140 and a storage apparatus 150. Since standard ranges of the metabolite compositions corresponding to different ages, different genders, and different occupations are different, the storage apparatus 150 stores the standard ranges of the metabolite compositions corresponding to different body feature parameter ranges. The control apparatus 120 is configured to obtain a body feature parameter range according to the identity recognized by the identity recognition component 121, and compare the compositions analysis result obtained by the metabolite analysis component 180 with the standard range of metabolite compositions corresponding to the body feature parameter range. When the compositions analysis result is outside the standard range, it indicates that the user has a health problem. At this time, the control apparatus 120 controls the prompt apparatus 140 to prompt that the user has the health problem correspondingly. The prompt apparatus 140, for example, provides a corresponding reminder by means of voice or text display. For example, a display apparatus is provided on the smart toilet 100. When the control apparatus 120 determines that the current user has a hidden health risk, the analysis result of the user index not within the standard range is displayed on the display apparatus. Of course, it can be understood that even if the user has no hidden health risks, the control apparatus 120 also displays the analysis result on the display apparatus, so that the user can understand own body health.

In order to reduce the budget of the control apparatus 120 and the requirements for the storage capacity of the storage apparatus, in some embodiments, the smart toilet 100 further includes a communication component 160. The control apparatus 120 is configured to communicate with a server 200 through the communication component 160, and upload the compositions analysis result obtained by the metabolite analysis component 180 and the corresponding identity information recognized by the identity recognition component 121 to the server 200. The server 200 determines the user's health status. The server 200 also stores pathological analyses corresponding to different test results. The server 200 predicts the user's health status based on the user's metabolite test results, for example, predict which part of the body of the user has a problem, and send the result of determination to the smart toilet 100 to be displayed in the prompt apparatus 140. Of course, it can be understood that a corresponding APP is installed on a terminal (such as a mobile phone or ipad or other mobile terminals), and the server 200 sends the result of prediction to the terminal to be displayed. Further in some embodiments, the server 200 further communicates with an online diagnosis platform 300. When it is detected that the user has hidden health risks, the server 200 sends the user's metabolite test results to the online diagnosis platform 300 by obtaining user authorization, an online doctor performs online diagnosis and feeds back a diagnosis result to the server 200. And the server 200 forwards the result to the smart toilet 100 or the mobile terminal 400 for the user to view. In addition, the server 200 also analyzes the diagnosis result and pushes a conditioning and improvement plan to the user.

Further, the compositions analysis result of the metabolite analysis component 180 is stored in the storage apparatus 150 in a manner corresponding to the identity recognized by the identity recognition component 121, so that the user's physical parameters are recorded when the user goes to the hospital to see a doctor, and data stored in the storage apparatus 150 is extracted for the doctor's reference, so the doctor can make a good judgment on the user's condition.

Figure 3:
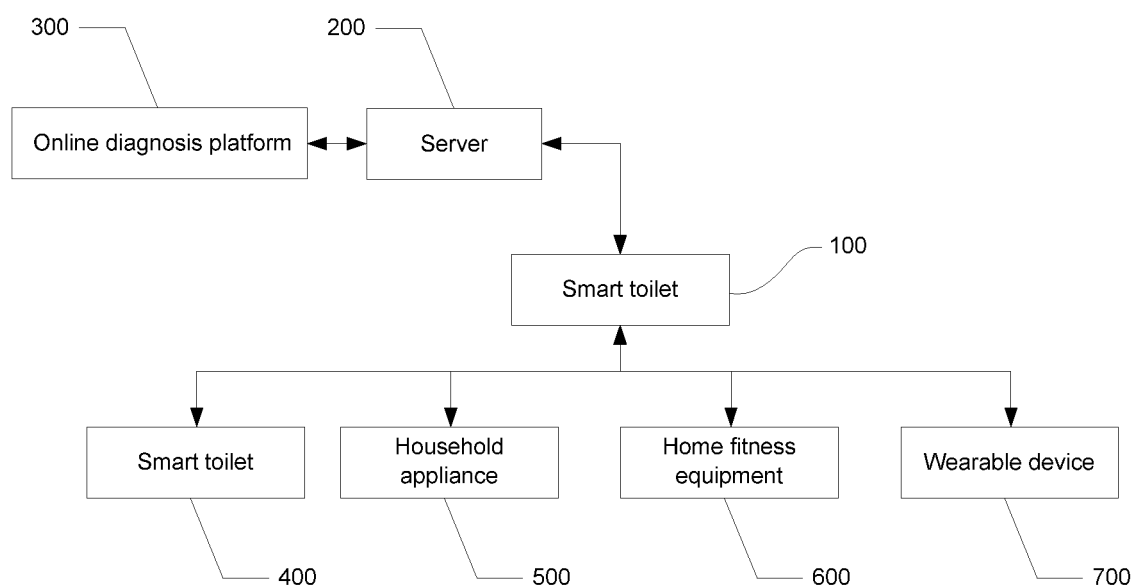
FIG. 3 illustrates a schematic structure diagram of an electric appliance system according to a specific implementation manner of the disclosure.

Further in some embodiments, the disclosure further provides an electric appliance system, as shown in FIG. 3, which includes the above smart toilet 100, and further includes a smart device, such as a wearable device 700 (such as a smart bracelet), home fitness equipment 600, and a household appliance 500. The household appliance 500 includes, for example, an air conditioner, a cooking appliance, an air purifier, a humidifier, a refrigerator, etc. The smart toilet 100 communicates with the smart device, and both the smart toilet 100 and the smart device communicate with the server 200.

In this way, the smart toilet 100 interacts with the smart device. For example, the smart device sends information that reflects the user's lifestyle to the smart toilet 100. The smart toilet 100 combines these lifestyle habits to recognize the identity of the user. The information reflecting the user's lifestyle habits includes, for example, the user's fitness habits, the user's eating habits, the frequency of the user using the air conditioner, the set temperature of the air conditioner used, the type of food in the refrigerator, and the like. For another example, the smart toilet 100 determines the user's physical health according to the user's metabolite compositions, and pushes prompt information to the smart device according to the user's physical health, such as push an appropriate temperature setting value to the air conditioner, push the dietary recommendations, dietary taboos and other information to the cooking appliance, push the air purification degree information to the air purifier, push the appropriate humidity setting value to the humidifier, push the dietary advice to the refrigerator, push a fitness plan to the household fitness equipment 600, and the like. In addition, the wearable device 700 further sends the detected user's heart rate, blood pressure, sleep status, and exercise status to the smart toilet 100. The smart toilet 100 combines information detected by the wearable device 700 such as the user's metabolite compositions and the user's heart rate, blood pressure, sleep status, exercise situation to make a comprehensive judgment on the user's health status, thereby improving the accuracy of diagnosis of the user's health status.

The smart toilet 100 and the smart device further perform information interaction with the server 200. For example, the smart device sends information that reflects the user's lifestyle to the server 200. The server 200 sends the information to the smart toilet 100. The smart toilet 100 combines these lifestyle habits to recognize the identity of the user. The information reflecting the user's lifestyle habits includes, for example, the user's fitness habits, the user's eating habits, the frequency of the user using the air conditioner, the set temperature of the air conditioner used, the type of food in the refrigerator, and the like. For another example, the smart toilet 100 sends the detected component information of the user's metabolite to the server 200. The server 200 determines the user's physical health according to the user's metabolite compositions, and pushes prompt information to the smart device according to the user's physical health, such as pushes an appropriate temperature setting value to the air conditioner, pushes the dietary recommendations, dietary taboos and other information to the cooking appliance, pushes the air purification degree information to the air purifier, pushes the appropriate humidity setting value to the humidifier, pushes the dietary advice to the refrigerator, pushes a fitness plan to the household fitness equipment 600, and the like. For example, when it is determined by analysis that the user has fatty liver, the server 200 draws up a fitness plan that matches the user's weight and age and send the fitness plan to the home fitness equipment 600, and also controls the home fitness equipment 600 to periodically remind the user to urge the user to exercise on time. And the server 200 further formulates a matching recipe and sends the matching recipe to the cooking appliance to remind the user to arrange their own diet according to the recommended recipe to improve the user's fatty liver condition. For another example, when it is determined by analysis that the user has a respiratory disease, the server 200 sends a control signal to the air purifier to control the air purifier to automatically purify indoor air periodically. And the server 200 further sends recommended recipes to the home fitness equipment 600 to improve the user's breathing environment and improve the user's comfort. For another example, when it is determined by analysis that the user has chronic nephritis, the server 200 pushes information to the cooking appliance. When the user turns on the cooking appliance, the cooking appliance will remind the user not to put chili, pepper, or alcoholic food in the process of cooking food. In addition, the wearable device 700 further sends the detected user's heart rate, blood pressure, sleep status, and exercise status to the server. The server 200 combines information detected by the wearable device 700 such as the user's metabolite compositions and the user's heart rate, blood pressure, sleep status, exercise situation to make a comprehensive judgment on the user's health status, thereby improving the accuracy of diagnosis of the user's health status.

Further in some embodiments, in order to improve the accuracy of the smart toilet 100 to detect the metabolite of the user, the terminal or the wearable device 700 sends a note to the user, for example, send a reminder suggesting fasting for metabolite detection in the early morning. In some embodiments, when the wearable device 700 that detects the user's sleep status, such as a smart bracelet, detects that the user wakes up, it automatically reminds the user by sound or text, and reminds the user to go to the toilet on an empty stomach to test metabolites. Of course, the smart bracelet further sends information to the mobile terminal 400 such as a mobile phone, and the mobile terminal 400 sends reminder information to the user.

The smart toilet 100 provided by the disclosure acquires the feature information such as the voiceprint information and the odor information of the user through the information acquisition apparatus 110 without manual operation. The control apparatus 120 of the smart toilet 100 integrates various feature information of the user to perform accurate identity recognition on the user.

Those skilled in the art easily understand that the above optional solutions are freely combined and superimposed on the premise of no conflict.

It should be understood that the above implementation manners are exemplary, and not limiting, without departing from the basic principles of the disclosure. Those skilled in the art make various obvious or equivalent modifications or replacements for the above details, which will be included within the scope of the claims of the disclosure.

Those of ordinary skill in the art understand that, in some embodiments, all or part of the steps in various methods of the above embodiments is completed by instructing relevant hardware through a program. In some embodiments, the program is stored in a computer-readable storage medium. In some embodiments, the storage medium includes a Read Only Memory (ROM), a Random Access Memory (RAM), a magnetic disk or an optical disk, and the like.

The terms "a/an" and "the" and similar words (especially in the appended claims) are used in describing the concepts of the disclosure, and these terms should be interpreted to cover both singular and plural. In addition, unless otherwise stated herein, when describing a numerical range herein, it is a shortcut method to refer to each independent value belonging to a relevant range, and each independent value is incorporated into this specification as if these values were stated separately herein. In addition, unless otherwise indicated herein or the context clearly indicates the contrary, the steps of all methods described herein are performed in any appropriate order. The changes in the disclosure are not limited to the described sequence of steps. Unless otherwise claimed, the use of any and all examples or exemplary language (e.g., "for example") provided herein is to further illustrate the concept of the disclosure and does not limit the scope of the concept of the disclosure. Those skilled in the art will readily understand various modifications and adaptations without departing from the spirit and scope.

What is claimed is:

1. A smart toilet, comprising:
    an information acquisition apparatus, comprising a voiceprint recognition apparatus, an odor scanner, a position detection component and a timing component, configured to acquire feature information of the smart toilet in a working state, the feature information at least comprising voiceprint information of a human body using the smart toilet acquired by the voiceprint recognition apparatus, odor information of the human body using the smart toilet acquired by the odor scanner, a position of the human body relative to the smart toilet acquired by the position detection component, and usage time of the smart toilet acquired by the timing component; and
    a control apparatus, comprising an identity recognition component, configured to recognize, according to the feature information, an identity of the human body using the smart toilet;
    wherein the identity recognition component is configured to use an artificial neural network algorithm to recognize the identity of the human body using the smart toilet according to the feature information, wherein the artificial neural network algorithm is used for fitting a corresponding relationship between the identity of the human body and the feature information.

2. The smart toilet as claimed in claim 1, wherein the information acquisition apparatus further comprises: a face recognition component and a weighing component, and the feature information further comprises at least one of the followings: face image information acquired by the face recognition component and a weight of the human body acquired by the weighing component.

3. The smart toilet as claimed in claim 1, further comprising: a metabolite sampling apparatus, configured to sample metabolites excreted into the smart toilet by the human body, and
    the control apparatus further comprises a metabolite analysis component, configured to analyze compositions of the metabolites sampled by the metabolite sampling apparatus.

4. The smart toilet as claimed in claim 3, wherein the metabolite analysis component is configured to analyze at least one of the followings: pH, urine specific gravity, urobilinogen, occult blood, leukocyte content, urine protein content, bilirubin content, ketone body content, urine red blood cell content, and urine color in urine; and the metabolite analysis component is configured to analyze at least one of the followings: a red blood cell count, white blood cell content, pus cell content, and the type and content of parasite eggs in feces.

5. The smart toilet as claimed in claim 3, further comprising: a storage apparatus, the control apparatus being configured to store a compositions analysis result obtained by the metabolite analysis component in the storage apparatus in a manner corresponding to the identity recognized by the identity recognition component.

6. The smart toilet as claimed in claim 5, further comprising: a communication component, wherein the control apparatus is configured to communicate with a server and a terminal through the communication component, and the control apparatus is configured to upload, through the communication component, the compositions analysis result of the metabolite analysis component and the corresponding identity information recognized by the identity recognition component to the server and the terminal.

7. The smart toilet as claimed in claim 5, further comprising: a prompt apparatus, the storage apparatus is further configured to store a standard range of metabolite compositions corresponding to different body feature parameter ranges, and the control apparatus is configured to obtain a body feature parameter range according to the identity recognized by the identity recognition component, and compare the compositions analysis result of the metabolite analysis component with the standard range of metabolite compositions corresponding to the body feature parameter range, and when the compositions analysis result is outside the standard range, the control apparatus is further configured to control the prompt apparatus to prompt that the compositions analysis result is outside the standard range.

8. The smart toilet as claimed in claim 1, further comprising: an information entry component, configured to enter identity information, and the identity recognition component is configured to recognize the identity of the human body using the smart toilet according to the feature information and the identity information entered by the information entry component.

9. An electric appliance system, comprising the smart toilet as claimed in claim 1, and further comprising a smart device, the smart device comprising at least one of a wearable device, home fitness equipment, and a household appliance, wherein the smart toilet is connected with the smart device, and both the smart toilet and the smart device are connected with a server.

10. The electric appliance system as claimed in claim 9, wherein the household appliance comprises at least one of an air conditioner, a cooking appliance, an air purifier, a humidifier, and a refrigerator.

11. The electric appliance system as claimed in claim 9, wherein the smart toilet further comprises a metabolite sampling apparatus and a metabolite analysis component, the metabolite sampling apparatus is configured to sample metabolites excreted into the smart toilet by a human body, the metabolite analysis component is configured to analyze the compositions of the metabolites sampled by the metabolite sampling apparatus, and a control apparatus of the smart toilet or the server is configured to push prompt information to the smart device according to a compositions analysis result obtained by the metabolite analysis component.

12. The electric appliance system as claimed in claim 11, wherein the prompt information comprises at least one of a dietary advice, a fitness plan, and a recommended environment parameter setting.

13. The smart toilet as claimed in claim 3, wherein the metabolite analysis component is configured to analyze at least one of the followings: pH, urine specific gravity, urobilinogen, occult blood, leukocyte content, urine protein content, bilirubin content, ketone body content, urine red blood cell content, and urine color in urine.

14. The smart toilet as claimed in claim 3, wherein the metabolite analysis component is configured to analyze at least one of the followings: a red blood cell count, white blood cell content, pus cell content, and the type and content of parasite eggs in feces.

15. The smart toilet as claimed in claim 5, further comprising: a communication component, wherein the control apparatus is configured to communicate with a server through the communication component, and the control apparatus is configured to upload, through the communication component, the compositions analysis result of the metabolite analysis component and the corresponding identity information recognized by the identity recognition component to the server.

16. The smart toilet as claimed in claim 5, further comprising: a communication component, wherein the control apparatus is configured to communicate with a terminal through the communication component, and the control apparatus is configured to upload, through the communication component, the compositions analysis result of the metabolite analysis component and the corresponding identity information recognized by the identity recognition component to the terminal.

17. An electric appliance system, comprising the smart toilet as claimed in claim 1, and further comprising a smart device, the smart device comprising at least one of a wearable device, home fitness equipment, and a household appliance, wherein the smart toilet is connected with the smart device.

18. An electric appliance system, comprising the smart toilet as claimed in claim 1, and further comprising a smart device, the smart device comprising at least one of a wearable device, home fitness equipment, and a household appliance, wherein both the smart toilet and the smart device are connected with a server.

\* \* \* \* \*